United States Patent [19]
Gosnell et al.

[11] Patent Number: 5,348,787
[45] Date of Patent: Sep. 20, 1994

[54] PROTECTIVE SHIELD FOR VERTICAL TRACKS

[76] Inventors: David R. Gosnell, 8707 Watterson Trail, Louisville, Ky. 40299; Ernest E. Riney, 4216 Flintlock Dr. #9, Louisville, Ky. 40216

[21] Appl. No.: 727,102

[22] Filed: Jul. 9, 1991

[51] Int. Cl.⁵ .......................... B32B 3/04; B60J 7/00; A47B 95/00
[52] U.S. Cl. .................... 428/121; 248/345.1; 293/123; 293/142; 296/183; 296/188; 296/199; 428/122; 428/174; 428/192
[58] Field of Search .............. 428/174, 31, 83, 121, 428/122, 358, 99, 192, 412; 248/345.1; 52/734, 288, 718.04, 717.05; 296/188, 199, 183, 901, 100; 293/123, 142; 224/907; 49/462; 24/297

[56] References Cited

U.S. PATENT DOCUMENTS

| | | | |
|---|---|---|---|
| 4,291,076 | 9/1981 | Katoh | 428/31 |
| 4,366,196 | 12/1982 | Maekawa et al. | 428/31 |
| 4,548,843 | 10/1985 | Kozuka et al. | 428/31 |
| 4,807,921 | 2/1989 | Champie et al. | 296/98 |
| 4,838,004 | 6/1989 | Adell | 52/718.1 |
| 4,999,233 | 3/1991 | Probst et al. | 428/122 |
| 5,021,611 | 6/1991 | Amano | 174/88 R |
| 5,108,801 | 4/1992 | Takahashi | 428/31 |
| 5,162,139 | 11/1992 | Gomez et al. | 428/31 |

*Primary Examiner*—Donald J. Loney
*Attorney, Agent, or Firm*—Charles G. Lamb

[57] ABSTRACT

A protective shield or member is provided for the vertical door tracks of a delivery truck wherein the protective shield is generally an elongated substantially transparent C-shaped member constructed of a hard flexible plastic material.

8 Claims, 1 Drawing Sheet

PROTECTIVE SHIELD FOR VERTICAL TRACKS

BACKGROUND OF THE INVENTION

This invention relates to truck beds and more particularly to an improvement in the protection to the paint and decals on the vertical door tracks from abuse during loading and unloading of materials in a truck bed.

In the loading and unloading of delivery trucks, particularly those of the type having vertically disposed door tracks along the sides to maintain and support products during transportation, the vertical door tracks are subjected to abuse and damage. The abuse and damage generally comes from the forks of forklifts when pallets or boxes or other containers carrying products therein are loaded onto or unloaded from the truck. Repainting or replacing decals is an expensive job to the owners of these trucks particularly those which are utilized for deliveries of beer, soft drinks and the like.

SUMMARY OF THE INVENTION

This invention relates to a protective shield for door tracks for truck beds. More particularly, this invention relates to the use of protective shields on door tracks to maintain truck appearances. Even further, the present invention relates to an improved protective shield for vertical door tracks for delivery trucks.

More particularly, the present invention relates to an improvement in a truck having a bed attached to said truck, said bed including a plurality of spaced vertical door tracks positioned a pre-selected distance along the outer perimeter of said bed, the improvement comprising:elongated protective shields circumscribing said door tracks at pre-selected positions along said door tracks.

DESCRIPTION OF THE PREFERRED EMBODIMENT

Figure 2:
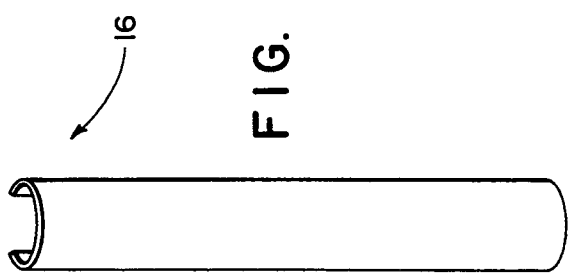
FIG. 2 is an enlarged perspective view of the protective shield of the present invention.
Figure 1:
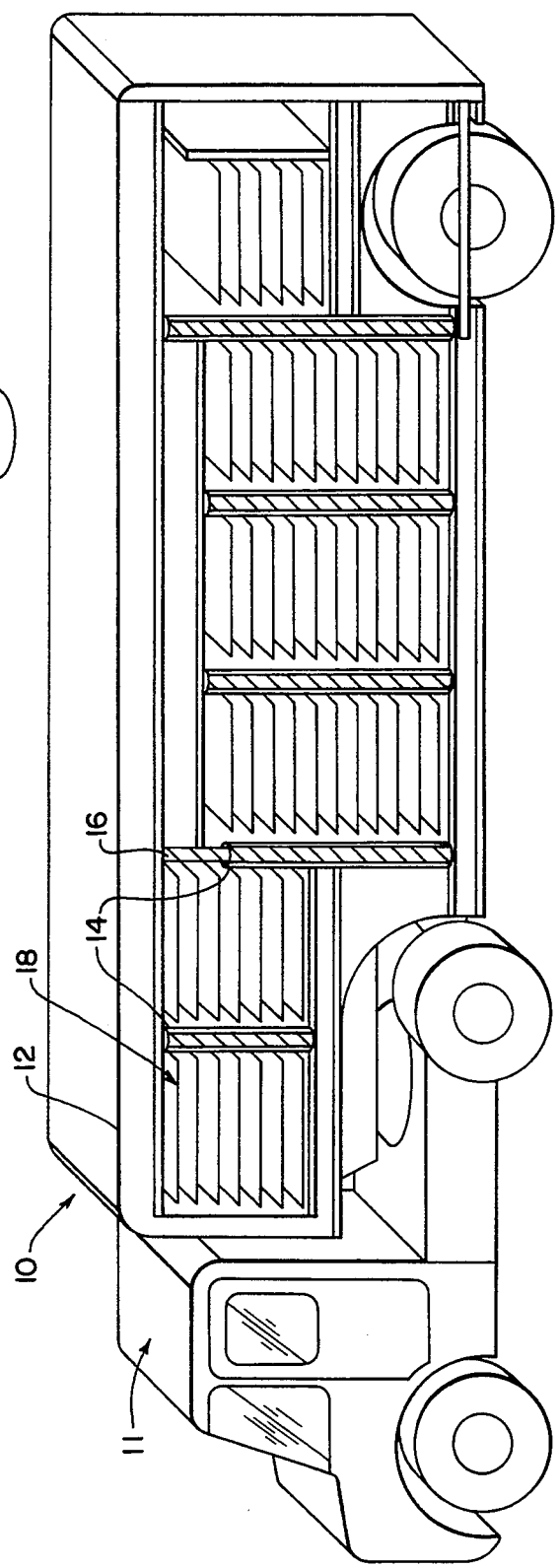
FIG. 1 is a perspective view of a delivery truck including the protective shield of the present invention with selected portions cut-away.

In FIG. 1, the numeral 10 designates a delivery truck having a truck bed or body 12 attached thereto. As shown the truck bed 12 is attached to the truck tractor portion 11 but it is realized that the truck bed 12 may be an independent or trailer portion which may be attached thereto. The truck bed 12 is provided with a plurality of vertically extending door tracks 14 which extend substantially the entire height of the truck 10. The distance between the door tracks 14 are pre-selected so that the distance is greater than the maximum width of a pair of forks on a forklift (not shown) so that the forks of a forklift may be movable in between adjacent door tracks for loading and unloading pallets or other product containing containers.

At pre-selected positions along the vertical door tracks 14 are protective members or shields 16 which are positioned along the vertical door tracks 14 at those locations where the forks of a forklift enter between adjacent door tracks 14. In most operations where the forklift is utilized to continually stack pallets and other containers on top of each other the vertical protective member 16 extends substantially the entire length of the vertical door tracks 14. Preferably the protective members or shields 16 are constructed of a hard, flexible transparent plastic material such as LEXAN, which is a trademark of General Electric Company for their polycarbonate products. The protective member is generally of substantially C-shaped configuration and is fitted along or circumscribes the outer surface of the door track member 14 which may come in contact with the forks of a forklift or skids or merchandise that is being loaded or unloaded.

In the drawing FIG. 1 racks 18 of the truck bed 12 are shown to receive cases of other containers of products which are to be transported in the delivery truck 10. However, it is realized that in some delivery operations the products to be transported will be maintained on portable pallets and the portable pallets may be stacked one on top of the other within the truck bed 12 as opposed to the use of racks 18 as shown.

In operation, the substantially C-shaped protective member 16 is easily snapped onto the vertical door tracks 14 which are generally some type of aluminum construction and in use receive the brunt of the forks of the forklift skids, or merchandise as the products to be transported in the delivery truck 10 are loaded. Upon continual abuse of the protective member 16 by the forks of a forklift and the like, it is significantly cheaper to replace the plastic part than to repair the damaged part of the door track 14.

The foregoing description of the invention is explanatory thereof and various changes in the size, shape and materials as well as in the details of the illustrative construction may be made within the scope of the appended claims without departing from the spirit of the present invention.

What is claimed is:

1. An improvement in a truck having a truck bed attached thereto, the improvement comprising: said truck bed including a plurality of spaced vertical door tracks positioned a pre-selected distance apart along the outer perimeter of said truck, and a plurality of elongated flexible, substantially C-shaped protective members circumscribing and abutting said door tracks at pre-selected positions along said door tracks.

2. The truck of claim 1 wherein said protective members are transparent.

3. The truck of claim 1, said door tracks being spaced horizontally from adjacent door tracks a distance sufficient to receive the forks of a forklift therebetween.

4. The truck of claim 1 wherein said protective members are a hard, flexible plastic material.

5. The truck of claim 4 wherein said hard, flexible plastic material is a polycarbonate.

6. A truck bed comprising: at least one vertical door track for said truck bed, and an elongated substantially C-shaped protective member, said member being constructed of a hard, flexible plastic material attached over said vertical door track.

7. The truck bed of claim 6 wherein said hard flexible plastic is a polycarbonate.

8. The truck bed of claim 6, said protective member being transparent.

* * * * *